United States Patent
Hjelmvik

(10) Patent No.: US 6,973,321 B2
(45) Date of Patent: Dec. 6, 2005

(54) METHOD OF SENDING ADVERTISING MESSAGES

(75) Inventor: Torbernt Hjelmvik, Järfälla (SE)

(73) Assignee: Modul-System Sweden AB, Järfälla (SE)

( * ) Notice: Subject to any disclaimer, the term of this patent is extended or adjusted under 35 U.S.C. 154(b) by 410 days.

(21) Appl. No.: 10/240,077

(22) PCT Filed: Mar. 29, 2001

(86) PCT No.: PCT/SE01/00690

§ 371 (c)(1),
(2), (4) Date: Sep. 26, 2002

(87) PCT Pub. No.: WO01/75823

PCT Pub. Date: Oct. 11, 2001

(65) Prior Publication Data

US 2003/0092387 A1    May 15, 2003

(30) Foreign Application Priority Data

Mar. 31, 2000 (SE) .................................. 0001170

(51) Int. Cl.⁷ ................................................ H04B 5/00
(52) U.S. Cl. .............................. 455/456.1; 455/404.2; 455/422.1; 455/412.2
(58) Field of Search ................ 455/404.1, 404.2, 455/412.1, 412.2, 456.1, 422.1

(56) References Cited

U.S. PATENT DOCUMENTS 5,852,775 A   12/1998 Hidary ..................... 455/504

FOREIGN PATENT DOCUMENTS

| EP | 0 797 368 A2 | 9/1997 | |
| EP | 0797368 A2 * | 9/1997 | ............ H04Q 7/22 |
| EP | 0 965 962 A1 | 12/1999 | |
| WO | WO 93/01665 | 1/1993 | |
| WO | WO 96/11453 * | 4/1996 | ............ G07C 1/30 |
| WO | WO 99/48062 | 9/1999 | |
| WO | WO 00/35216 | 6/2000 | |

* cited by examiner

Primary Examiner—Erika A. Gary
Assistant Examiner—Wayne Cai
(74) Attorney, Agent, or Firm—Alfred J. Mangels

(57) ABSTRACT

A method of sending advertising messages in connection with a vehicle parking system in which a mobile telephone (1) is used to commence and to terminate the parking of a vehicle and in which a telephone user sends the identity of the vehicle parking zone concerned to a receiving first computer (2) belonging to said parking system, in conjunction with the commencement and the termination of vehicle parking via the mobile telephone (1), wherein the identity of the parking zone and the telephone number of the mobile telephone (1) are detected and stored in the computer. The invention is characterised in that when a user connects himself to the parking system computer (2) by means of the mobile telephone (1) the parking system computer is caused to send the mobile telephone number and the identity of the parking zone in question, or the identity of the geographical area in which the parking zone is located, to a second computer (6) connected to a memory (7) in which the advertising messages are stored; and in that one or more advertising messages pertinent to said geographical area are caused to be sent to the mobile telephone (1) from the second computer (6).

8 Claims, 1 Drawing Sheet

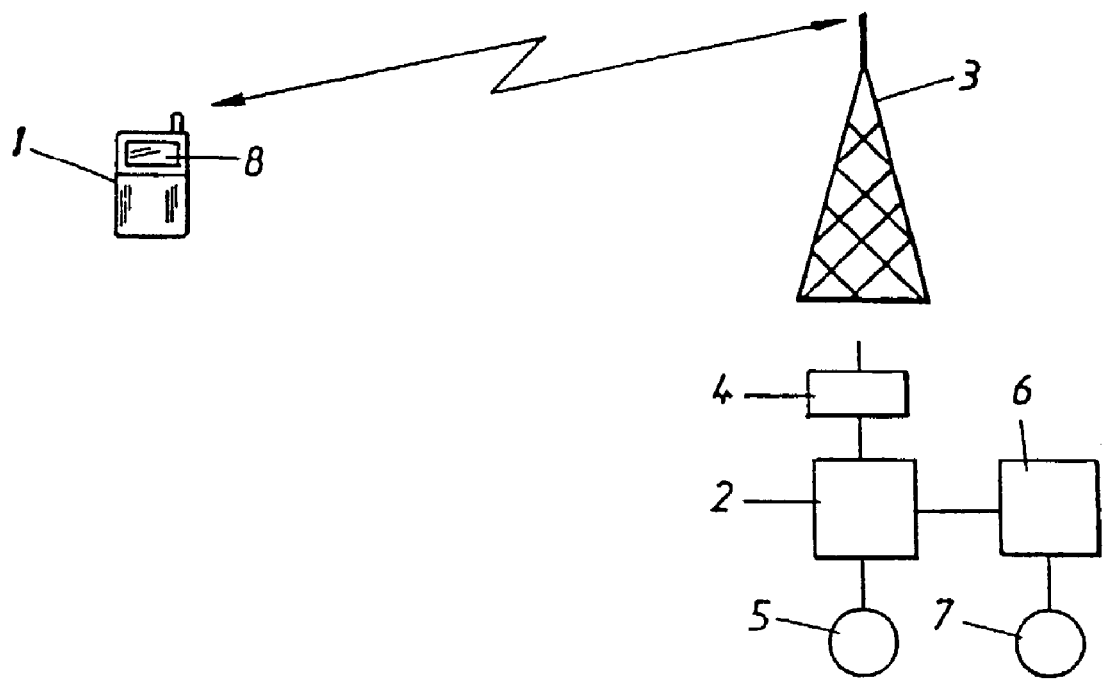

METHOD OF SENDING ADVERTISING MESSAGES

The present invention relates to a method of sending advertising messages to mobile telephones.

The present invention relates more particularly to sending advertising messages to mobile telephones used in conjunction with the parking of vehicles.

Swedish Patent Specification No. 9800888-1 teaches a system in which a mobile telephone is used in conjunction with vehicle parking. According to this patent specification, data on a cash card or like card in the possession of the telephone user and accepted by the parking system as a means of payment, and at least one user specific reference are stored in and tied together in a database belonging to the parking company concerned.

Preferably, part of the user specific reference consists of the telephone number of the telephone to be used in conjunction with parking of a vehicle. In this regard, the telephone number is caused to be detected by the computer of the parking system when the telephone is connected to a telephone number belonging to said system.

In one embodiment, the user specific reference includes a vehicle specific reference in the form of a plastic card or corresponding data carrier, where the reference consists in a machine-readable code carried by the card. A vehicle specific reference may, of course, instead consist of the vehicle registration number.

According to this embodiment billing on the cash card concerned is validated, by detecting the telephone number concerned when the telephone is connected to the parking system, said cash card being tied to the telephone number.

The telephone is connected to the parking system by the user of the mobile telephone calling a telephone number which identifies the parking zone concerned when commencing a parking period, said telephone number thus leading to the computer of the parking system in which the parking zone concerned is detected.

So that a check can be carried out to ascertain whether or not commencement of a parking period has been announced to the parking system, the system may be designed to enable a car park attendant to either read-off the registration number of the vehicle or, alternatively, said machine readable code.

An announcement via a telephone as to whether parking has been commenced and terminated respectively can thus be effected very smoothly.

One problem arising with advertising messages for products and services, and then particularly generally distributed advertising messages, is that there is no absolute certainty that the people to which the messages are directed will receive the messages.

One example in this respect is a restaurant or a sports shop that advertises in the daily press in a large city or town. Although many people may read the advertisement, only a very few will visit the restaurant or visit the aforesaid sport shop with the intention of purchasing goods.

In some cases, it would be better to make local advertisements in an effective way.

The present invention provides such a way.

Accordingly, the present invention relates to a method of sending advertising messages in connection with vehicle parking systems in which a mobile telephone is used to commence and terminate parking of a vehicle and where, when commencing and terminating a parking period via the mobile telephone, the user sends the identity of the parking zone concerned to a receiving first computer belonging to the parking system, wherein the identity of the parking zone and the number of the mobile telephone are detected and stored in the computer, and wherein the method is characterised in that when a user connects to the computer of the parking system via his mobile telephone, the parking system computer is caused to send the mobile telephone number and the identity of the parking zone concerned, or an indication of the geographical area in which the parking zone is located, to a second computer connected to a memory that includes advertising messages; and in that one or more advertising messages relating to said geographical area are caused to be sent from the second computer to the mobile telephone.

The invention will now be described in more detail with reference to exemplifying embodiments of the invention shown in the accompanying drawing, in which FIG. 1 is a schematic block diagram of devices included in a system in which the method is carried out.

FIG. 1 is a schematic block diagram of an arrangement for carrying out the present invention in sending advertising messages in connection with a vehicle parking system.

As illustrated, a mobile telephone 1 is used for commencing and terminating parking of a vehicle. When parking is commenced and terminated via the mobile telephone, the user sends the identification of the parking zone in question to a receiving first computer 2 belonging to the parking system. This is effected by a base station 3 belonging to a network operator receiving the telephone call and forwarding the call to the exchange or switching centre 4 of the network operator, which in turn directs the call to the computer 2 of the parking system. The computer 2 obtains an indication of the parking zone concerned, through the medium of the telephone number called by the user. The computer 2 also detects the number of the mobile telephone, this number being stored in the computer 2. The computer 2 includes a database 5 in which the user information is stored for the purpose of validating that parking of a vehicle has taken place and that payment has been paid.

When a telephone user connects to the system via his mobile telephone, the parking system computer according to the invention is caused to send the mobile telephone number and the identity of the parking zone in question, or the identity of the geographical area in which the parking zone is located, to a second computer 6 that is connected to a memory 7 in which the advertising messages are stored. In this regard, the first computer 2 may be adapted to structure a given parking zone to a given geographical area. For instance, all parking zones within a certain part of a city or town may be designated with the city area as a geographical area when the information is sent from the first computer 2 to the second computer 6. Other types of structures are, of course, possible. The intention is that the parking position of the vehicle shall be referred to a suitably large geographical area around the vehicle, said area being judged as being of appropriate size for local advertising.

According to the invention, one or more advertising messages relating to this geographical area are sent to the mobile telephone.

According to a first preferred embodiment one or more advertising messages are caused to be sent from the second computer 6 to the first computer 2, when said second computer 6 receives a telephone number and the identity of a geographical area. The first computer 2 is herewith caused to transfer pertinent advertising messages to the mobile telephone.

According to a second, alternative, preferred embodiment, the second computer 6 is caused to send one or more advertising messages to the mobile telephone when said second computer receives a telephone number and the identity of a geographical area, by virtue of the second computer calling the mobile telephone direct via the network operator. This call may be a separate call or may take over the existing mobile telephone call between the mobile telephone and the first computer via said first computer 2.

Thus, in accordance with the present invention, when a vehicle is parked through the medium of a mobile telephone, the calling person will receive advertisements relating to shops, gas stations, restaurants, etc., all of which are located within a relatively narrow geographical area relative to the place where the vehicle is parked.

This significantly increases the penetrating power of the advertisements, while the person parking the vehicle is able to readily and quickly make use of for instance the various offers in the close vicinity of the place where the vehicle is parked.

According to one preferred embodiment, the advertising messages concerned are caused to be sent to the mobile telephone when the user has connected his telephone to the first computer 2. The user will receive the advertising messages in conjunction with commencing or terminating a parking period.

In an alternative embodiment, the advertising messages concerned are caused to be sent to the mobile telephone as a result of the computer in question calling said mobile telephone. The telephone user therewith answers in a common fashion and will then receive the advertising message.

According to one embodiment, the advertising messages are audible messages.

According to another embodiment of the invention, the advertising messages are messages that are presented on the mobile telephone display 8, such as so called SMS messages.

The second computer and its associated database can be owned and operated by someone other than the operator of the parking system, for instance an advertising company. In this case, the advertising company may purchase from the parking company information relating to the call coupled to the first computer and the geographical location of the vehicle. The advertising company therewith selects suitable advertising messages and sends these messages to the calling telephone.

To make it attractive to listen to the advertisements, the calling person may, for instance, be given certain a rebate on his parking fee in the form of a certain part of the parking fee being paid by the advertising company, when the telephone user listens to the whole of the advertising message. Such transactions take place between the first computer and the second computer prior to the user being billed for parking of the vehicle.

The present invention thus provides a method in which advertising messages are received with greater certainty by people for whom they are intended.

Although the invention has been described with reference to a number of exemplifying embodiments, it will be obvious to the person skilled in this art that the described method can be modified. For instance, the first and the second computers may physically consist in one and the same computer.

The present invention shall not therefore be considered restricted to the aforedescribed exemplifying embodiments thereof, as variations and modifications can be made within the scope of the accompanying claims.

What is claimed is:

1. A method of sending advertising messages in connection with a vehicle parking system in which a mobile telephone is used to commence and to terminate the parking of a vehicle and in which a telephone user sends the identity of the vehicle parking zone concerned to a receiving first computer belonging to said parking system, in conjunction with the commencement and the termination of vehicle parking via the mobile telephone, wherein the identity of the parking zone and the telephone number of the mobile telephone are detected and stored in the computer, said method comprising the steps of: transmitting to the receiving first computer belonging to the parking system by means of a mobile telephone the identity of a vehicle parking zone; transmitting from the first computer to a second computer the calling mobile telephone number and a geographical indicator representative of the identity of at least one of the parking zone in question and the geographical area in which the parking zone is located, wherein the second computer is connected to a memory in which advertising messages are stored; selecting from the stored advertising messages at least one advertising message relating to an entity located within a predetermined geographical area related to the parking zone in which the vehicle has commenced a parking period; sending from the second computer to the calling mobile telephone one or more selected advertising messages pertinent to at least one of the parking zone in question and said geographical area, wherein transmission of relevant advertising messages to the mobile telephone takes place when the mobile telephone user connects his mobile telephone to the first computer.

2. A method according to claim 1, including the steps of: transmitting advertising messages from the second computer to the first computer when said second computer receives a telephone number and the geographical indicator; and transmitting the advertising messages from said first computer to the calling mobile telephone.

3. A method according to claim 1, including the steps of: transmitting advertising messages from the second computer to the calling mobile telephone when said second computer receives a telephone number and a geographical indicator.

4. A method according to claim 1, wherein the transmission of pertinent advertising messages to the calling mobile telephone takes place in response to one of the first computer and the second computer calling the telephone number of the mobile telephone.

5. A method according to claim 1, wherein the advertising messages are audible messages.

6. A method according to claim 1, wherein the advertising messages are in the form of messages presented on the display carried by the mobile telephone.

7. A method according the claim 1, wherein the messages are SMS messages.

8. A method according to claim 1, wherein the parking system includes a plurality of geographically distributed parking zones, and the second computer sends to a parking system user advertising messages pertinent to a parking zone that is identified by the parking system user upon transmitting a parking zone identifier to the first computer by a mobile telephone call.

* * * * *